(12) United States Patent
Dillhoff

(10) Patent No.: US 6,910,893 B2
(45) Date of Patent: Jun. 28, 2005

(54) CARD GAME FOR LEARNING

(75) Inventor: Richard Dillhoff, Las Vegas, NV (US)

(73) Assignee: Funway Games, LLC, Las Vegas, NV (US)

( * ) Notice: Subject to any disclaimer, the term of this patent is extended or adjusted under 35 U.S.C. 154(b) by 0 days.

(21) Appl. No.: 10/368,350

(22) Filed: Feb. 20, 2003

(65) Prior Publication Data

US 2003/0165805 A1 Sep. 4, 2003

Related U.S. Application Data

(60) Provisional application No. 60/410,043, filed on Sep. 12, 2002, provisional application No. 60/393,910, filed on Jul. 1, 2002, provisional application No. 60/393,913, filed on Jul. 1, 2002, provisional application No. 60/393,912, filed on Jul. 1, 2002, provisional application No. 60/386,550, filed on Jun. 5, 2002, provisional application No. 60/372,350, filed on Apr. 12, 2002, and provisional application No. 60/357,861, filed on Feb. 21, 2002.

(51) Int. Cl.$^7$ .............................................. G09B 19/22
(52) U.S. Cl. ...................... 434/129; 273/299; 273/302
(58) Field of Search .................................. 434/129, 188; 273/299, 300, 301, 302, 303, 304, 308

(56) References Cited

U.S. PATENT DOCUMENTS

| | | | |
|---|---|---|---|
| 631,766 A | 8/1899 | Holman | |
| 1,012,574 A | 12/1911 | Adams | |
| 2,607,595 A | 8/1952 | Mathes | |
| 3,935,651 A | 2/1976 | Mankoff et al. | |
| 4,219,197 A | 8/1980 | Acuff | |
| 4,333,656 A | 6/1982 | Sommer | |
| 4,801,149 A | * 1/1989 | Alnafissa | 273/302 |
| 5,018,976 A | * 5/1991 | Kuyath | 434/207 |
| 5,033,754 A | * 7/1991 | Finch | 273/299 |
| 5,141,235 A | 8/1992 | Hernandez | |
| 5,242,171 A | * 9/1993 | Hata | 273/292 |
| 5,690,336 A | * 11/1997 | Oliver | 273/302 |
| 6,109,924 A | 8/2000 | Sanford, Sr. et al. | |
| 6,220,597 B1 | 4/2001 | Scibetta | |
| 6,234,486 B1 | 5/2001 | Wallice | |
| 6,276,940 B1 | 8/2001 | White | |
| 6,382,629 B1 | 5/2002 | Hill | |
| 6,447,300 B1 | 9/2002 | Greenberg | |
| 6,474,649 B1 | 11/2002 | Kennedy et al. | |

* cited by examiner

*Primary Examiner*—Kurt Fernstrom
(74) *Attorney, Agent, or Firm*—McGuireWoods LLP

(57) ABSTRACT

A card game for learning entails competitive play between players. As the game proceeds, the winner of a match must recite out loud the facts of learning printed on the playing cards. The game repetitively exposes the players to facts in a given subject area such as math, history, science, geography, literature, etc. The learning experience may be geared to different age brackets by tailoring the subject facts to different age brackets. Audible and visual cues help players to associate information for memory retention. Different decks for different age brackets and subjects are provided.

24 Claims, 13 Drawing Sheets

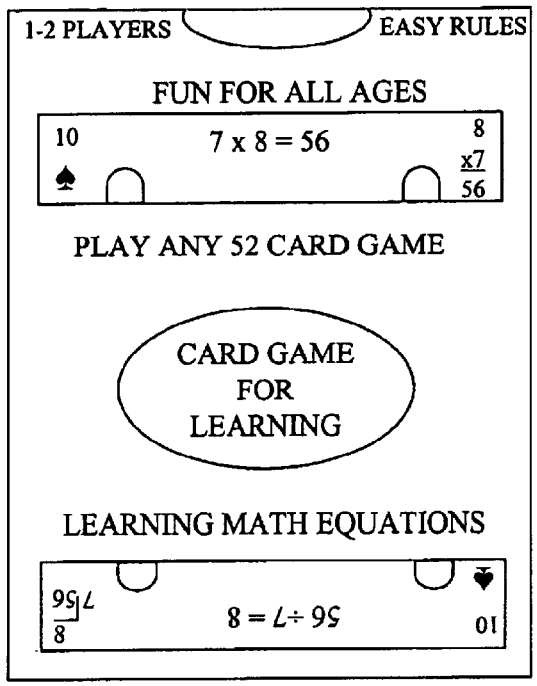
FIGURE 3A
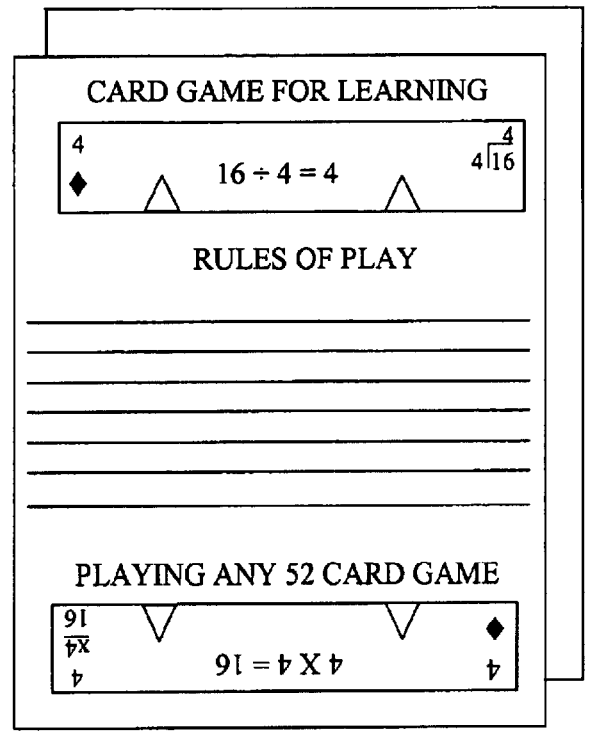
FIGURE 3B  (1-n decks)
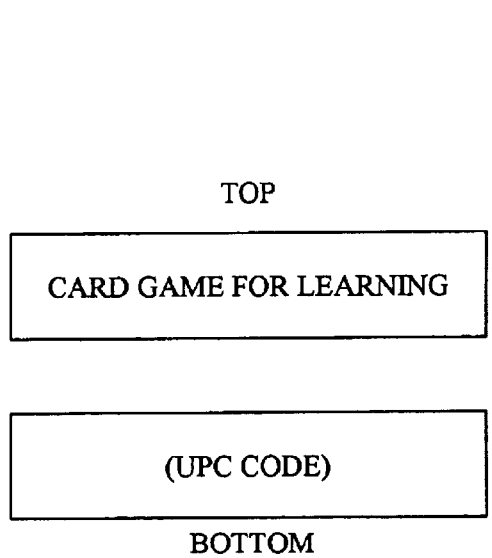
FIGURE 3C
FIGURE 3D

| | | | | | | | |
|---|---|---|---|---|---|---|---|
| A♠ | 12x12=144 /110 | A♥ | 11x12=132 | A♦ | 11x11=121 | A♣ | 9x12=108 |
| K♠ | 9x11=99 | K♥ | 8x12=96 | K♦ | 8x11=88 | K♣ | 7x12=84 |
| Q♠ | 9x9=81 | Q♥ | 7x11=77 | Q♦ | 6x12=72 | Q♣ | 8x9=72 |
| J♠ | 6x11=66 | J♥ | 8x8=64 | J♦ | 7x9=63 | J♣ | 5x12=60 |
| 10♠ | 7x8=56 | 10♥ | 5x11=55 | 10♦ | 6x9=54 | 10♣ | 7x7=49 |
| 9♠ | 4x12=48 | 9♥ | 6x8=48 | 9♦ | 5x9=45 | 9♣ | 6x7=42 |
| 8♠ | 5x8=40 | 8♥ | 3x12=36 | 8♦ | 4x9=36 | 8♣ | 6x6=36 |
| 7♠ | 5x7=35 | 7♥ | 4x8=32 | 7♦ | 5x6=30 | 7♣ | 4x7=28 |
| 6♠ | 3x9=27 | 6♥ | 5x5=25 | 6♦ | 2x12=24 | 6♣ | 3x8=24 |
| 5♠ | 4x6=24 | 5♥ | 3x7=21 | 5♦ | 4x5=20 | 5♣ | 2x9=18 |
| 4♠ | 3x6=18 | 4♥ | 2x8=16 | 4♦ | 4x4=16 | 4♣ | 3x5=15 |
| 3♠ | 2x7=14 | 3♥ | 2x6=12 | 3♦ | 3x4=12 | 3♣ | 2x5=10 |
| 2♠ | 3x3=9 | 2♥ | 2x4=8 | 2♦ | 2x3=6 | 2♣ | 2x2=4 |

| | | | | | | | |
|---|---|---|---|---|---|---|---|
| A♠ | 144÷12=12 /110 | A♥ | 132÷11=12 | A♦ | 121÷11=11 | A♣ | 108÷9=12 |
| K♠ | 99÷9=11 | K♥ | 96÷8=12 | K♦ | 88÷8=11 | K♣ | 84÷7=12 |
| Q♠ | 81÷9=9 | Q♥ | 77÷7=11 | Q♦ | 72÷6=12 | Q♣ | 72÷8=9 |
| J♠ | 66÷6=11 | J♥ | 64÷8=8 | J♦ | 63÷7=9 | J♣ | 60÷5=12 |
| 10♠ | 56÷7=8 | 10♥ | 55÷5=11 | 10♦ | 54÷6=9 | 10♣ | 49÷7=7 |
| 9♠ | 48÷4=12 | 9♥ | 48÷6=8 | 9♦ | 45÷5=9 | 9♣ | 42÷6=7 |
| 8♠ | 40÷5=8 | 8♥ | 36÷3=12 | 8♦ | 36÷4=9 | 8♣ | 36÷6=6 |
| 7♠ | 35÷5=7 | 7♥ | 32÷4=8 | 7♦ | 30÷5=6 | 7♣ | 28÷4=7 |
| 6♠ | 27÷3=9 | 6♥ | 25÷5=5 | 6♦ | 24÷2=12 | 6♣ | 24÷3=8 |
| 5♠ | 24÷4=6 | 5♥ | 21÷3=7 | 5♦ | 20÷4=5 | 5♣ | 18÷2=9 |
| 4♠ | 18÷3=6 | 4♥ | 16÷2=8 | 4♦ | 16÷4=4 | 4♣ | 15÷3=5 |
| 3♠ | 14÷2=7 | 3♥ | 12÷2=6 | 3♦ | 12÷3=4 | 3♣ | 10÷2=5 |
| 2♠ | 9÷3=3 | 2♥ | 8÷2=4 | 2♦ | 6÷2=3 | 2♣ | 4÷2=2 |

FIGURE 4A

| RANK | SPADES | HEARTS | DIAMONDS | CLUBS |
|---|---|---|---|---|
| 2 | 110<br>1+1=2<br>1-1=0 | 2+0=2<br>2-0=2 | 1+0=1<br>1-0=1 | 0+0=0<br>0-0=0 |
| 3 | 5+1=6<br>5-1=4 | 4+1=5<br>4-1=3 | 3+1=4<br>3-1=2 | 2+1=3<br>2-1=1 |
| 4 | 9+1=10<br>9-1=8 | 8+1=9<br>8-1=7 | 7+1=8<br>7-1=6 | 6+1=7<br>6-1=5 |
| 5 | 5+2=7<br>5-2=3 | 4+2=6<br>4-2=2 | 3+2=5<br>3-2=1 | 2+2=4<br>2-2=0 |
| 6 | 9+2=11<br>9-2=7 | 8+2=10<br>8-2=6 | 7+2=9<br>7-2=5 | 6+2=8<br>6-2=4 |
| 7 | 6+3=9<br>6-3=3 | 5+3=8<br>5-3=2 | 4+3=7<br>4-3=1 | 3+3=6<br>3-3=0 |
| 8 | 4+4=8<br>4-4=0 | 9+3=12<br>9-3=6 | 8+3=11<br>8-3=5 | 7+3=10<br>7-3=4 |
| 9 | 8+4=12<br>8-4=4 | 7+4=11<br>7-4=3 | 6+4=10<br>6-4=2 | 5+4=9<br>5-4=1 |
| 10 | 7+5=12<br>7-5=2 | 6+5=11<br>6-5=1 | 5+5=10<br>5-5=0 | 9+4=13<br>9-4=5 |
| J | 7+6=13<br>7-6=1 | 6+6=12<br>6-6=0 | 9+5=14<br>9-5=4 | 8+5=13<br>8-5=3 |
| Q | 8+7=15<br>8-7=1 | 7+7=14<br>7-7=0 | 9+6=15<br>9-6=3 | 8+6=14<br>8-6=2 |
| K | 9+9=18<br>9-9=0 | 9+8=17<br>9-8=1 | 8+8=16<br>8-8=0 | 9+7=16<br>9-7=2 |

| RANK | SPADES (120) | HEARTS (121) | DIAMONDS (122) | CLUBS (123) |
|------|--------|--------|----------|-------|
| A | 1+1=2 | 1-1=0 | 1x1=1 | 1/1=1 |
| 2 | 2+1=3 | 2-1=0 | 2x1=2 | 2/1=2 |
| . | . | . | . | . |
| . | . | . | . | . |
| . | . | . | . | . |
| . | . | . | . | . |
| K | 13+1=14 | 13-1=12 | 13x1=13 | 13/13=1 |

FIGURE 6A

| RANK | SPADES | HEARTS | DIAMONDS |
|------|--------|--------|----------|
| A | Bonn is the Capital of Germany. | Paris is the Capital of France. | Madrid is the Capital of Spain. |
| 2 | Danke means Thank you. | Merci means Thank you. | Gracias means Thank you. |
| . | . | . | . |
| . | . | . | . |
| . | . | . | . |
| K | Bitte means Please. | Si vous Plait means .... Please. | Por favor means Please. |

FIGURE 6B

CARD GAME FOR LEARNING

CROSS REFERENCE TO RELATED APPLICATIONS

This application claims priority to the following provisional applications: application No. 60/386,550 filed Jun. 5, 2002; application No. 60/372,350 filed Apr. 12, 2002; application No. 60/357,861 filed Feb. 21, 2002; application No. 60/393,910 filed Jul. 1, 2002; application No. 60/393,913 filed Jul. 1, 2002; application No. 60/410,043 filed Sep. 12, 2002; application No. 60/393,912 filed Jul. 1, 2002, each of these applications are incorporated by reference herein in their entirety.

BACKGROUND OF THE INVENTION

1. Field of the Invention

The present invention generally relates to card games, and, more particularly to a card game for learning by including facts on the card which become part of the game proceedings.

2. Background Description

The process of learning new information by children, juveniles and adults has been via varying methods and techniques. For young children many types of techniques have been in use such as books, books with pictures, board games, computer games, and some card games. Learning is a human process, which has many different avenues. Learning techniques depend on the individuals and the type of subject information to be learned. Simple tools as books and pictures have been the mainstays of learning. Computers and electronic representation of books and card games have also come into existence. Computer based games have been very popular and most often focus on entertainment and competition. Some computer games attempt to impart a learning experience of new information.

An aspect of learning is retention. The final result of learning is whether the information has been remembered and retained. This result is often linked to the method of the initial learning itself and often the repetition factor involved. Various techniques give different retention results for various age brackets. Every individual person has different abilities to learn and retain information and respond differently to various presentations of information for a given age bracket.

Expense of the learning tool is a factor in choice of methods to use for learning a subject. Computer based tools are typically more expensive than books and books typically more expensive than board games or card games. The venues for learning can also influence what tools are employed to learn. For example, traveling in a car or airplane may prohibit use of an electronic device, but use of a simple card game may be satisfactory.

Different age brackets generally relate to the type of learning that may be appropriate. For example, young children are more inclined to be learning the alphabet or numbers. As the bracket age increase, the nature of the subject material would vary.

U.S. Pat. No. 4,333,656 discloses a deck of playing cards with an alphabet. The goal of the game is to spell words by aligning the cards. This is a type of learning card game but has no visual repetition factor and little audio re-enforcement.

SUMMARY OF THE INVENTION

In embodiments, this invention addresses several aspects of learning in a simple and direct manner while being of low cost. The invention is a card game, which provides a means of delivering basic information for learning in a fun setting while offering the excitement of competition. The game uses a deck of fifty-two cards composed of four suits, clubs, diamonds, hearts, and spades. Clubs and spades are black suits; diamonds and hearts are red suits. Each suit having face values on the cards of 2, 3, 4, 5, 6, 7, 8, 9, 10, Jack, Queen, King, and Ace. This arrangement still permits traditional games such as poker and rummy to be played in addition to this invention. Additionally, on the face of each card are one or more facts of information. For example, for a young child age bracket interested in learning basic math, the deck of cards would bear essential math facts such as addition, subtraction, multiplication, division equations or representations. As the game progresses according to the rules of the game as discussed below, the contestants play individual hands and the players simply verbally recite (speak to the opponent) one of the facts of information (such as a math equation, literature fact, foreign language vocabulary, science property, bible/religion facts, or world geography fact, or the like) on the card in order to claim the trick or win a match. Decks of cards are constructed so that facts of information on the cards are geared or scaled to age brackets. The fact areas that include the information may be color coded to aid in visual reinforcement.

Over time, the repetitiveness of reciting the facts out loud will give audio and visual re-enforcement to memory retention and the learning process while at the same time, a competitive social event is transpiring between the players which places the learning in an environment of enjoyment and leisure. In embodiments, basic facts of information are seen and heard over and over again, giving rise to learning by rote and memory etching.

BRIEF DESCRIPTION OF THE DRAWINGS

The invention can better be understood from the following detailed description of the preferred embodiment of the invention and by referring to the illustrative drawings in which:

FIGS. 3A and 3B shows an illustrative layout of cards;

FIGS. 3C and 3D shows a layout of a typical card deck package, top and bottom and sides;

FIG. 4A shows exemplary multiplication and division tables and possible card assignments;

FIG. 4B shows exemplary addition and subtraction tables and possible card assignments;

FIG. 6A shows a categorization of information by suits and rank; and

FIG. 6B shows a categorization by suit of languages;

DETAILED DESCRIPTION OF THE INVENTION

Figure 2:
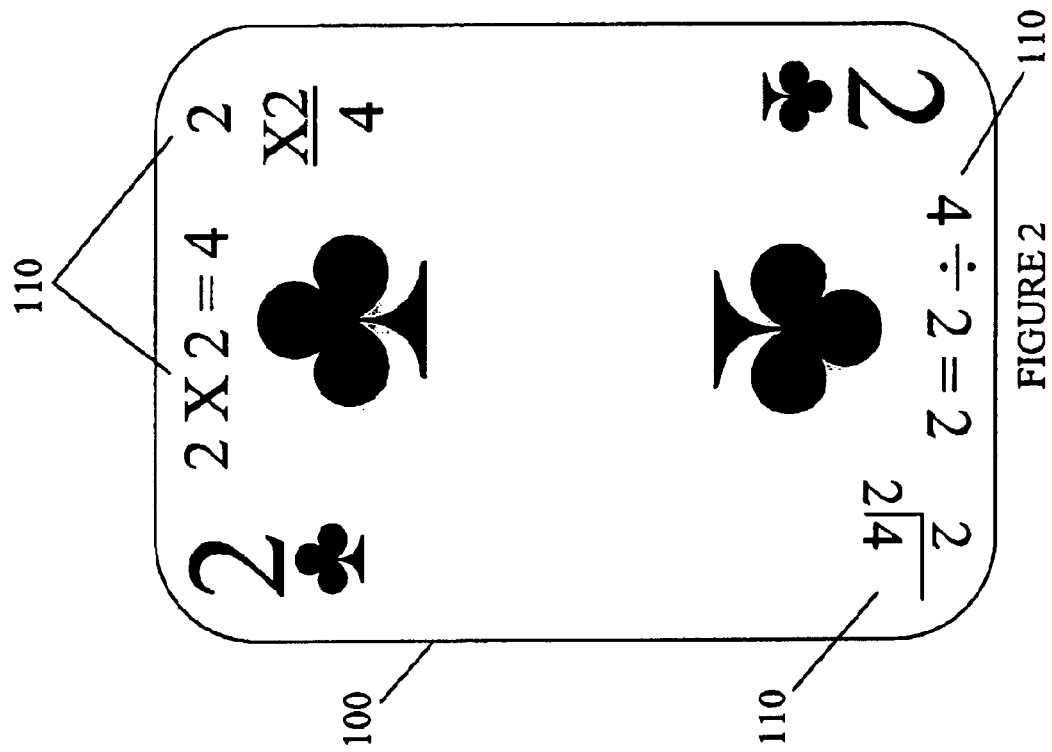
FIG. 2 shows a representative obverse side of each card of a representative game deck showing one suit of four.
Figure 1:
FIG. 1 is a playing card representative of the fifty two cards in an exemplary deck bearing the name of a card game embodiment.

The present invention is a card playing game of fifty-two cards of four suits. FIG. 1 is an illustration of one side of one of the fifty two cards and shows an exemplary name of a game. On the other side of the cards are the suits of clubs, diamonds, hearts and spades. FIG. 2 shows an example of clubs 100. Each suit has thirteen ranks with face values of 2, 3, 4, 5, 6, 7, 8, 9, 10, Jack, Queen, King, and Ace.

FIGS. 3A, 3B, 3C, and 3D show representative examples of the six sides of a card deck box suitable for packaging the present invention.

A particular deck is typically targeted to a particular subject area such as math, language, geography, science, literature, history or mythology, however mixing subjects is feasible. Any subject area can be scaled to age brackets and a unique deck created for that bracket and given subject area. For example (the following are examples of a very wide range of possible information facts, which should not be a limiting factor of the present invention), a young child would have the math subject area geared to addition and subtraction. A slightly older age bracket would have a unique deck geared to multiplication and division as shown in FIG. 4A. FIG. 4B shows another possible exemplary card assignment pattern by suits and rank. The equations are placed in various "fact areas" 110 of the card suitable for reading. These areas are known as "fact areas" and can be placed at various places on the face of the playing card depending on the subject areas of the deck and a card may have several "fact areas". The fact areas typically express a complete thought, which may include a complete math equation either in symbolic math or verbal sentence, complete chemistry equation, complete physics equation, or a complete sentence thought such as, for example, "Carbon has a symbol of C", or "George Washington was the first President", or the like. Multiple sentences or equations may occur.

Figure 5:
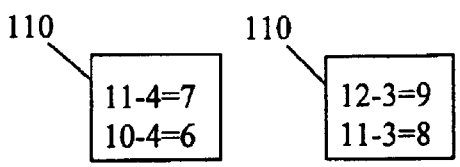
FIG. 5 shows another exemplary addition and subtraction tables for an older age bracket and possible assignments.

FIG. 5 shows yet another assignment of math equations for a different age bracket with two equations per fact area. The two equations may be separated on a card in two distinct fact areas. Multiple equations and multiple facts may occur on a card.

FIG. 6A shows an exemplary categorization of information. Addition facts are associated with spades, subtraction facts are associated with hearts, multiplication facts are associated with diamonds, and division facts are associated with clubs. Any association is possible. Further, an association may be made with the rank of a card. For example, the ordinal number one (and associated operations across the suits) is associated with the card rank of ace (A). The ordinal number of two (and associated math operations across the suits) is associated with the card rank of two and the pattern continues throughout the deck. The suits 120, 121, 122 and 123 can be printed in different colors and categories associated with a color. Colors can also be associated with rank and categories.

FIG. 6B shows an exemplary categorization by language. In this example, the fact areas 110 are arranged so that German related facts are associated with the suit of spades, French related facts are associated with hearts, Spanish related facts are associated with Diamonds, and clubs with another language (not shown). Also, the rank may have a categorization across the languages. For example, the rank of Ace across the suits refers to appropriate country capitals for the suit's language category. The rank of King is associated with the phrase "please" in each respective language category. This type of pattern categorization can be applied to nearly any type of fact categorization by subject areas. Relationships between facts, and facts themselves, are easier to master when visual associations exist (e.g., card suits and rank) and re-enforced by audio repetition (e.g., as in a card game). Categorization and relationships can occur at nearly any level, i.e., close relationships or broad relationships, as shown by the different language relationships of FIG. 6B.

Algebra or geometry facts would be suitable for junior high or high school age students and a unique deck would exist for this subject and age bracket. It's "fact areas" would then contain algebra or geometry facts or equations such as, for example, x+x=2x, and area=length×height. Science decks may include chemistry equations, physics equations, electrical equations, or other science equations.

Science decks would be geared by age brackets with basic science facts for young children such as "water is a liquid", "ice is a solid", "air is a gas" in the "fact areas". For older age brackets, a deck could contain elements of the periodic table such as "Carbon has an atomic weight of 12", for advanced ages more sophisticated equations would comprise the deck such as chemical equations or equations such as PV=nRT representing the equation for partial pressures. Any equation of chemistry physics, geology, or the like could be feasible.

In history, for a young child, simply facts about States of the Union would be feasible. For older students, countries of the world with capitals would be appropriate.

If the deck is geared to astronomy then facts might be "Earth has one moon", Jupiter has "X" moons ("X" being correct to reflect new moon discoveries), or "Moon has a 29½ day period". The facts should preferably be short and succinct to aid the rapid progress of the game, however if the subject area requires longer recitations of facts, then this can be accommodated.

For languages, simple vocabulary, which may include noun declensions or verb conjugations, could be printed on the cards in the "fact areas", for example "amo means I love." in Latin and may be included in an all-Latin deck of cards, for example. Spelling facts can be learned in a similar fashion. Languages could be bracketed so that multiple decks could exist for a given language, each deck increasing in depth of vocabulary or difficulty. Playing the card game would help expose and familiarize the players with the language or information facts. Additionally, for certain subjects such as languages, careful crafting of the decks could also aid the subliminal memory in subtle ways. For example, noun declensions would appear only on red suits (hearts and diamonds) and verb conjugations would appear only on black suits. Various associations can exist. Color coded information does have a subtle role in remembering and retaining information. Even more refinement could occur, for example, nouns only on hearts, verbs on clubs, adjectives on spades, pronouns on diamonds.

Organization of facts into categories along visual cues can aid learning, either in suits, card rank, or by differing colors. For math, it is reasonable for the same reasoning to place "addition facts" on particular color suits and "subtraction facts" in the other color suits. When information can be categorized in some logical manor and associated with some element of a game, such as segregating the information by color, suit or card rank, gives more associative impetus to remembering the facts. Human memory has unique ways of association, much of which is not clearly understood, but using colors, audio, and visual cues enhances the chances for the human memory to remember facts.

Providing a package of decks in a given subject area with levels of increasing difficulty is also an aspect of the present invention. For example, in a Spanish language area, there may be a dozen or more decks in a package, each deck progressively more difficult. There may even be several packages to provide different age brackets with multiple decks for each bracket. If players choose to combine decks to expand the learning breadth and subject material, the following rules will accommodate them.

A given deck of cards (for a particular subject and age bracket) has a simple set of rules for playing the game itself. Examples of basic sets of rules is as follows and a deck may include multiple sets of rules:

Rules of Play

Rules of play for embodiments of the card game are now presented. In an embodiment, the rules are as follows, for one or more players, typically two:

a) Shuffle the deck and deal all the cards facedown to the players. Do not look at the cards.

b) Each player turns up the top card of their stack and places it on the center of the table. The higher rank of card tentatively wins each match.

c) The winning player must correctly state either the math equation or statement of fact on any faceup card in each match to collect all of the cards (usually two) and place them on their pile. If the player does not correctly state one of the equations or statement of fact, the opponent wins the match.

d) If the two cards are the same rank (referred to as a Show Down), each player places one more card facedown on the table and yet another card faceup. The higher faceup card wins the match and the player scores a Show Down.

e) A player reshuffles their pile as necessary when they run out of cards. Play continues until the game winner scores a total of three showdowns (or a predetermined number).

In another embodiment of the card game, the rules are as follows, for two or more players:

a) The object of the game is to score points by memorizing information on cards drawn from the stack. A player may draw three cards (or predetermined number) per turn, then memorize each one and place them facedown on their pile. Each fact may be spoken up to three times (or a predetermined number) to help memorization.

b) Shuffle the deck and place the stack facedown on the center of the table. The player left of the dealer draws the top card. The player states the complete fact of information at the top of the card, then places it facedown on the table to form their pile.

c) Players may draw up to three cards (or predetermined number) and then begin restating the information from memory. Cards may not be drawn after a player has begun to restate a fact, and the restatement cannot be corrected. A fact is restated and the top card of their pile is turned over. A player places the card in their score area if the restatement matches a fact on the top card. The rest of their pile is placed on a discard pile when a player does not correctly restate information on the top card. A player has a time limit of 15 seconds to restate the facts.

d) Play continues to the left in the same manner until the stack runs out cards. Score 10 points for each individual card in a rank, 50 points for a pair, 100 points for three of a kind, and 500 points for four of a kind. If players are tied for the highest score, the discard pile is reshuffled for the leading players, and one card is drawn per turn until the stack runs out of cards. Scoring may be modified by a predetermined point system.

In another embodiment, of the card game, the rules are as follows, for two to five players:

a) The object of the game is to collect the most "books". A book is four different suits of the same rank.

b) Deal seven cards one at a time for two or three players, or deal five cards each for four to five players. The remainder of the deck becomes the stack, which is placed facedown on the center of the table.

c) The player left of the dealer looks at an opponent and asks for any rank of cards. The seeking player must have at least one card of the requested rank. The questioned player must surrender all of the cards in that rank and the seeking player takes another turn. If they do not have one, they say, "Draw it". Then the seeking player draws two cards from the top of the stack to end their turn.

d) If the drawn cards complete a book, or if the book is completed by the aid of an opponent, the player places the four cards faceup in their score area, and then states a math equations (e.g., 5×5=25) or statement of fact on each card. The player may also make a brief remark (optional) such as "the sky is blue" or "table is spelled "t-a-b-l-e".

e) The next player to the left takes their turn. Play continues in the same manner after the stack is gone. The winner of the game is the player who has collected the most books at the time any player runs out of cards.

In another embodiment of the card game, the rules are as follows, for two to twelve players:

a) The object of the game is to collect the most pairs of cards of the same rank, such as two kings or two tens. The winner is the player who matches the most pairs.

b) Shuffle the deck and place all of the cards facedown on the table. The player left of the dealer turns over two cards (or predetermined number) and places them in a location for viewing. If the cards do not match, all of the players view them for about three seconds (or predetermined time), then the player places them facedown in the same position.

c) The next player to the left turns over two cards. The player may collect the cards and take another turn each time there is a match. The player must look at the cards and state one of the facts of information on each card before placing them on their score pile, or the cards are returned to the playing area. Play continues in the same manner until all of the cards have been matched.

In another embodiment of the card game, the rules are as follows, for two to four players:

a) The object of the game is to score points by forming a spread. A spread is formed by matching three or four cards of the same rank, or by acquiring a sequence of three or more cards of the same suit. The point value of each card is 5 points for Ace to nine, and 10 points for ten to king (or other predetermined values).

b) Shuffle the deck and deal seven cards one at a time to all of the players. Place the remaining stack of the deck on the center of the table and turn over the top card to form the discard pile.

c) The game begins when the player left of dealer draws the top card from the stack, or draws the faceup card from the pile. If a spread is not formed in the hand, the player discards the card onto the pile to end the turn. Play continues clockwise in the same manner.

d) The players may observe and draw any amount of cards from the top of the discard pile, but if more than one card is drawn, the last card of those acquired in succession must be formed into a spread and placed faceup in their score area. A player may likewise pick up a fragment of a spread from the pile and place it in their score area if the cards can be added to any previously scored spread or fragment on the table to form an expansion. A player must state one of the equations or facts on each card in a spread or fragment while placing them in their score area, or the cards remain in their hand until their next turn.

e) Play ends when a card(s) is scored and the last unplayable card in a hand is discarded onto the pile. The cards are then tallied and reshuffled. A player that scores with the last card in their hand may not draw an unplayable card from the pile on their next turn. Add 25 points to the score of a player who makes the final discard in a round. Scoring may be modified using a predetermined point system.

In another embodiment of the card game, the rules are as follows, for two to four players:

a) The object of the game is to be the first player to remove all of the cards from your hand by matching the suit or rank of the top card on the pile. A player may remove one card from their hand per turn, or must draw one card from the stack of a match is not made. A drawn card may be discarded if it is playable.

b) Shuffle the deck and deal eight cards one at a time to all players. Place the remaining stack of cards on the center of the table and turn over the top card to form the discard pile.

c) The game begins when the player left of the dealer attempts to match the pile card. If a player changes the suit by matching a rank or playing a wild eight (or other predetermined wild card), they must state one of the equations on their discard before the next player starts their turn or it remains in the hand and a card is drawn from the stack. Play continues to the left in the same manner until a player runs out of cards.

d) A player may change the top card of the pile to a suit of choice by playing any wild eight (or predetermined wild card). The direction of the play is reversed when a four is discarded (or predetermined reverse card). When a two is discarded (or a predetermined draw card), the following player must draw two cards (or a predetermined number) from the stack before taking their turn. A player must announce the "last card" as they are playing their second to last card, or they must draw another card from the stack. The discard pile is reshuffled if the stack runs out of cards.

In another embodiment of the card game, the rules are as follows, for two or more players:

a) The object of the game is to be the first player to remove all of the cards from your hand by matching the suit of the card led in each round of play.

b) Shuffle the deck and deal seven cards one at a time to all the players. Place the remaining stack of cards on the center table.

c) The game begins when the player left of the dealer leads the play with any card from their hand. All of the players must follow suit of the card led in each round of play. If a play cannot be made on the suit led, the player must draw two cards (or a predetermined number) from the stack. A drawn card may likewise be played.

d) The player with the highest card of the suit led wins each trick and leads any card in the new round of play.

They must state one of the facts of information on any card in the trick, or forfeit the lead on the next round of play. The game continues in the same manner. If the stack runs out of cards, a player passes on their turn when they do not have a playable card.

The above Rules of Play would be applicable to any subject area or age bracket. The wording may change to reflect the subject area as necessary.

The concept of placing information facts on another established 52 playing card standard deck game or traditional card game is also possible. This invention is one particular type of card game, however it could be applied to other prevalent and known card games such as Fish, UNO, Crazy Eights, Old Maid, etc. Adding information facts to these games would be an easy addition to provide learning aspects to those games.

Playing The Game

The card game of the present invention provides opportunities to learn by seeing and hearing facts of information as presented on the cards of the presented invention by playing embodiments of the game. Visual and audio cues to aid in the learning process are provided by the layout of the cards, rules of the game, or by categorization of the information in relation to the card suits, card ranks, and colors.

FIGS. 7A–7F illustrate steps of performing embodiments of the present invention. The process begins at 150 of FIG. 7A, and continues at step 152 with providing a deck of cards that includes at least one fact area on every card, the fact area containing a factual statement or a complete equation. In step 154, the cards are dealt providing each player a hand to begin a game and non-dealt cards forming a stack. In step 156, at least one fact area is recited during the game to provide an opportunity to learn info associated with the fact area.

Figures 7A, 7B:
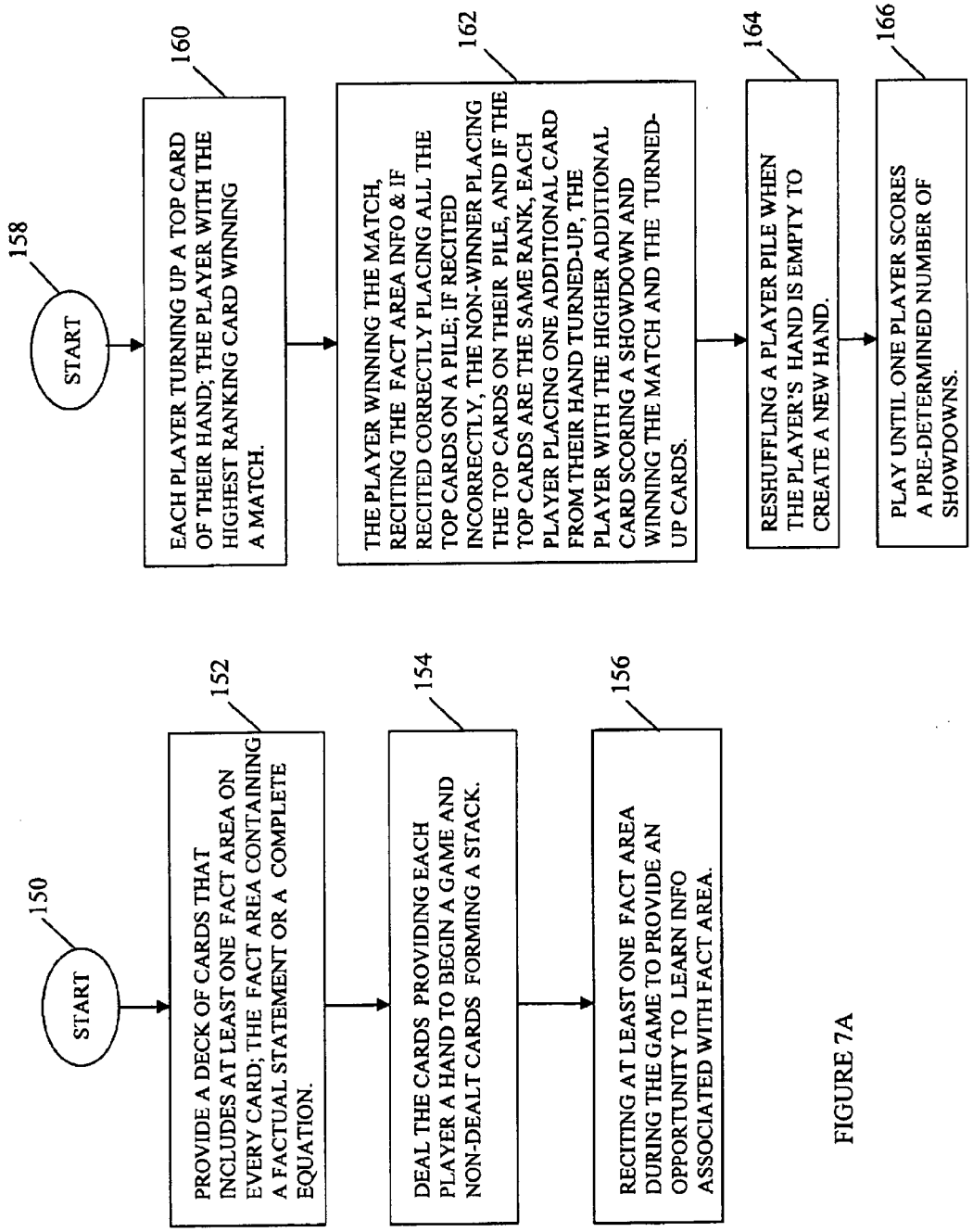
FIGS. 7A–7F are flowcharts showing steps of playing embodiments of the present invention.

FIG. 7B shows steps of an embodiment of the present invention beginning at step 158. At step 160, each player turns up a top card of their hand and the player with the highest-ranking card wins a match. At step 162, the player winning the match recites the fact area information and if recited correctly places all the top cards on a pile associated with the winning player. If the recitation is incorrect, the non-winner places the top cards on their pile, and if the top cards are the same rank, each player placing one additional card from their hand turned-up and the player with the higher additional card scoring a showdown and winning the match and all the turned-up cards. At step 164, a player's pile may be reshuffled when the player's hand is empty to create a new hand. At step 166, play continues until one player scores a pre-determined number of showdowns.

Figure 7C:
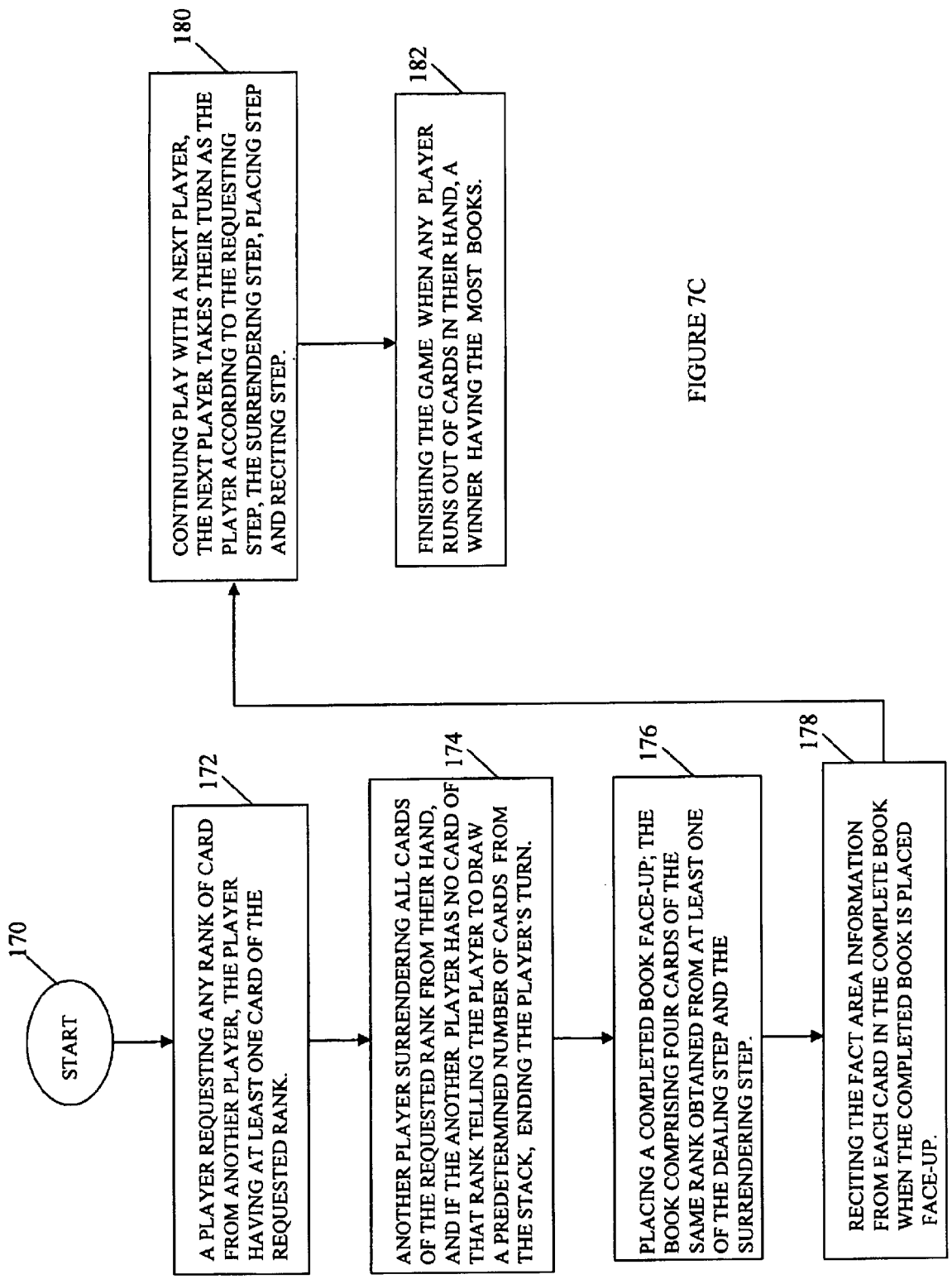

FIG. 7C show steps of another embodiment of the present invention beginning at step 170. At step 172, a player requests any rank of card from another player and the player must have a card of the same rank in their hand. At step 174, the another player whom the player asked, surrenders all cards of the requested rank from their hand and if the another player has no card of that rank, telling the asking player to draw a predetermined number of cards from the stack. This ends the player's turn. At step 176, a completed book is placed faceup wherein the book comprises four cards of the same rank obtained from either previous step e.g., step 174 or step 154. At step 178, fact area information is recited from each card in the completed book when a completed book is placed faceup. At step 180, the game continues with a next player taking their turn as the player (i.e., the asking player) and performs steps 172, 174, 176, and 178 as necessary according to the rules of the embodiment. At step 182, the game finishes when any player runs out of cards in their hand. A winner has the most books.

Figure 7D:
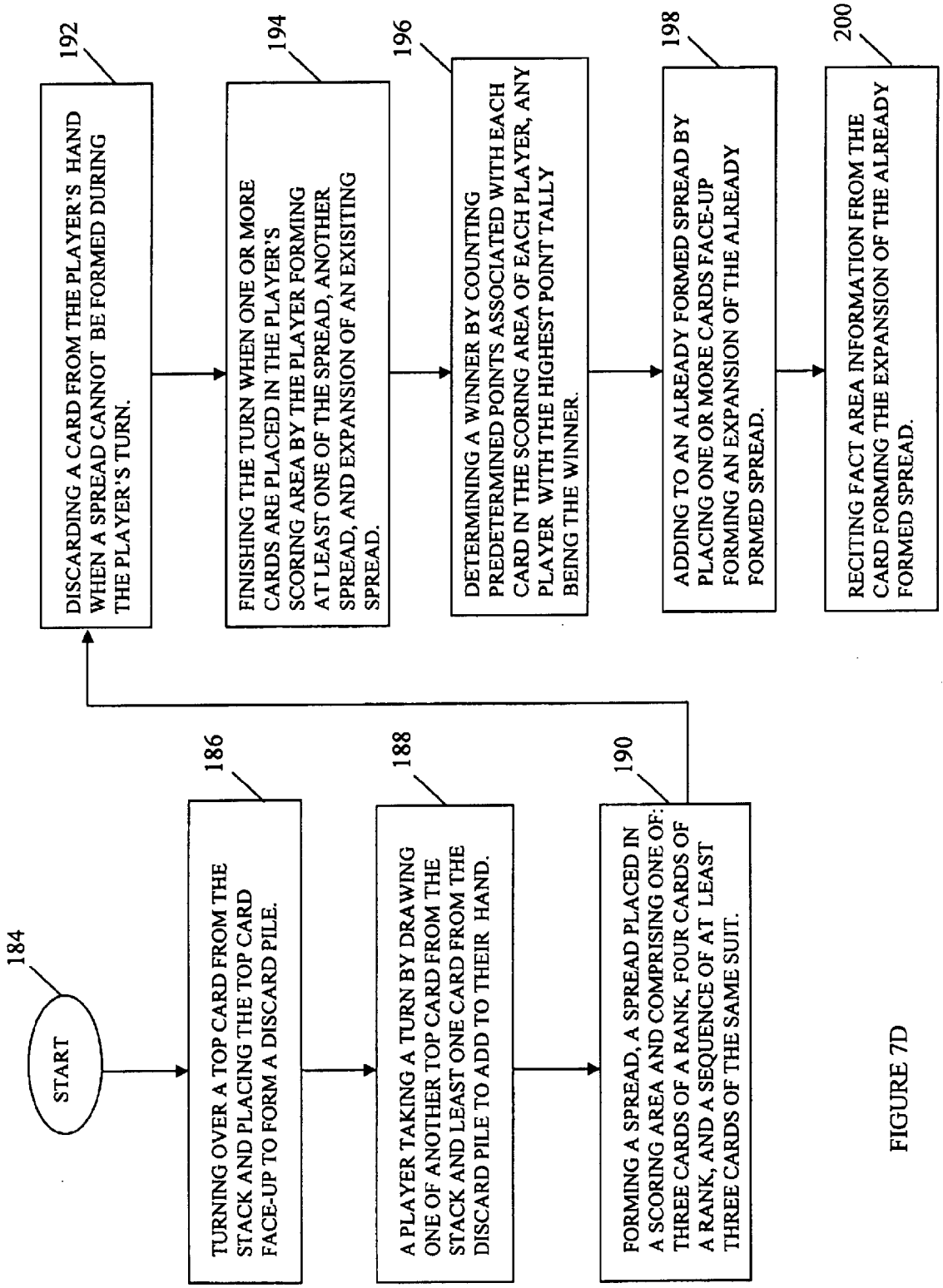

FIG. 7D shows the steps of another embodiment beginning at step 184. At step 186, a top card is turned over from the stack and placed faceup to form a discard pile. At step 188, a player taking a turn by drawing one of another top card from the stack and at least one card from the discard pile to add to their hand. At step 190, a spread may be formed and placed in a scoring area the spread comprising one of three cards of a rank, four cards of a rank, and a sequence of at least three cards of the same suit. At step 192, a player discards a card from their hand when a spread cannot be formed during the player's turn. At step 194, the turn is finished when one or more cards are placed in the player's scoring area by the player forming at least one of the spread, another spread, and an expansion of an existing spread. At step 196, a winner is determined by counting a predetermined point association with each card in the scoring area of each player, any player with the highest point tally being the winner. At step 198, adding to an already formed spread by placing one or more cards faceup forming an expansion of the already formed spread. At step 200, fact area information is recited from the card forming the expansion of the already formed spread.

Figure 7E:
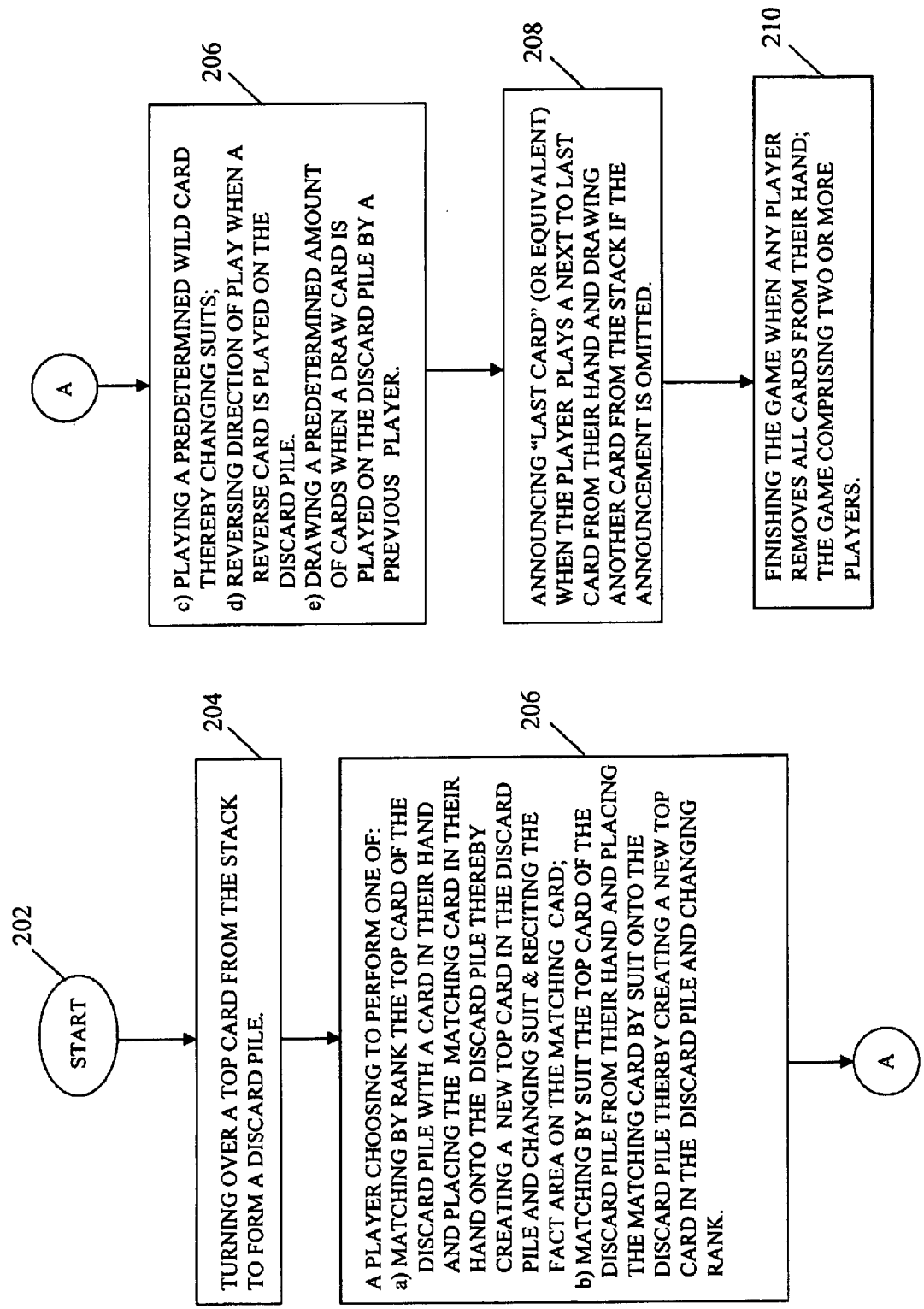

FIG. 7E is shows steps of another embodiment of the present invention beginning at step 202. At step 204, a top card is turned over from the stack forming a discard pile. At step 206, a player may choose to perform one of:

a) matching by rank the top card of the discard pile with a card in their hand and placing the matching card in their hand onto the discard pile thereby creating a new top card in the discard pile and changing suits. The player recites the fact area on the matching card;

b) matching by suit the top card of the discard pile from their hand and placing the matching card by suit onto the discard pile thereby creating a new top card in the discard pile and changing rank.

c) playing a predetermined wild card thereby changing suits;

d) reversing direction of play when a reverse card is played on the discard pile; and e) drawing a predetermined amount of cards when a draw card is played on the discard pile by a previous player.

At step 208, a player announces "last card" (or equivalent indication) when a player plays a next to last card from their hand and drawing another card from the stack if the announcement is omitted. At step 210, the game finishes when any player removes all cards from their hand. The game comprising two or more players.

Figure 7F:
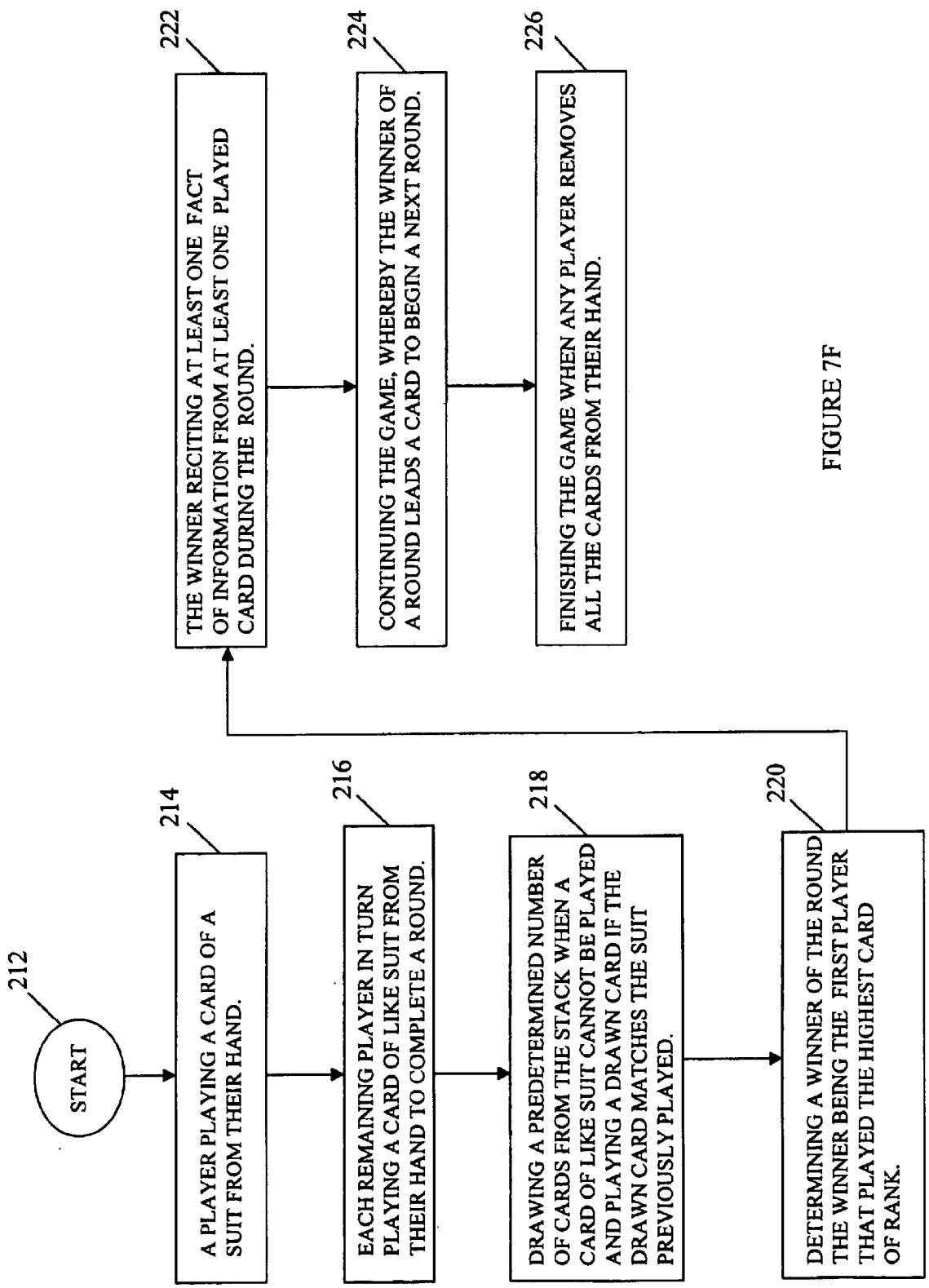

FIG. 7F shows the steps of another embodiment beginning at step 212. At step 214, a player plays a card of a suit from their hand. At step 216, each remaining player in turn playing a card of like suit from their hand to complete a round. At step 218, a predetermined number of cards are drawn from the stack when a card of like suit cannot be played and playing a drawn card if the drawn card matches the suit previously played. At step, 220, a winner of a round is determined and is the first player that played the highest card of rank. At step 222, the winner of the round recites at least one fact of information from at least one played card during the round. At step 224, the game continues whereby the winner of the round leads a card to begin a next round. At step 226, the game finishes when any player removes all the cards from their hand.

Figures 8A, 8B:
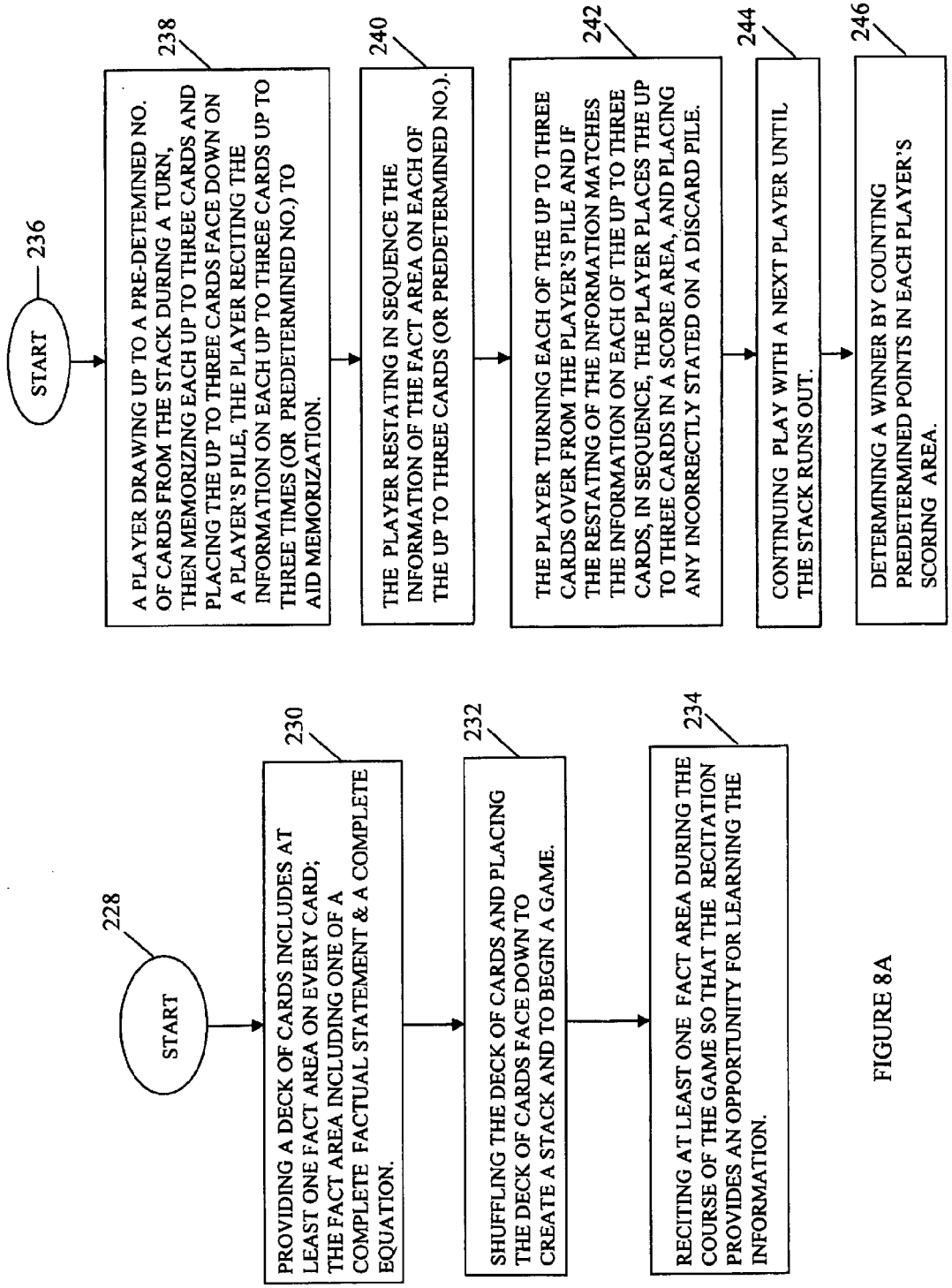
FIGS. 8A–8C are flowchart showing steps of playing additional embodiments of the present invention.

FIG. 8A show the steps of another embodiment starting at step 228. At step 230 a deck of cards is provided that includes at least one fact area on every card and the fact area including one of a complete factual statement and a complete equation. At step 232, the deck of cards is shuffled and placed facedown to create a stack and to begin the game. At step 234, reciting at least one fact area during the course of the game so that the recitation provides an opportunity for learning the information.

FIG. 8B shows steps of another embodiment of the present invention beginning at step 236. At step 238, a player draws (or predetermined number) three cards from the stack during a turn. They attempt to memorize the information on the cards drawn and place the cards facedown on a player's pile. The player then recites the information on the drawn cards up to three times (or predetermined number) to aid memorization. At step 240, the player restating the information in the fact area, in sequence, from memory. At step 242, the player turning each of the (or predetermined number) three cards over from the player's pile and if the restating of the information matches the information on each of the (or predetermined number) three cards, in sequence, the player places the three cards (or predetermined number) in a score area and placing any incorrectly stated cards on a discard pile. At step 244, the game continues with a next player until the stack runs out. At step 246, a winner is determined by counting predetermined points for the cards in the scoring areas.

Figure 8C:
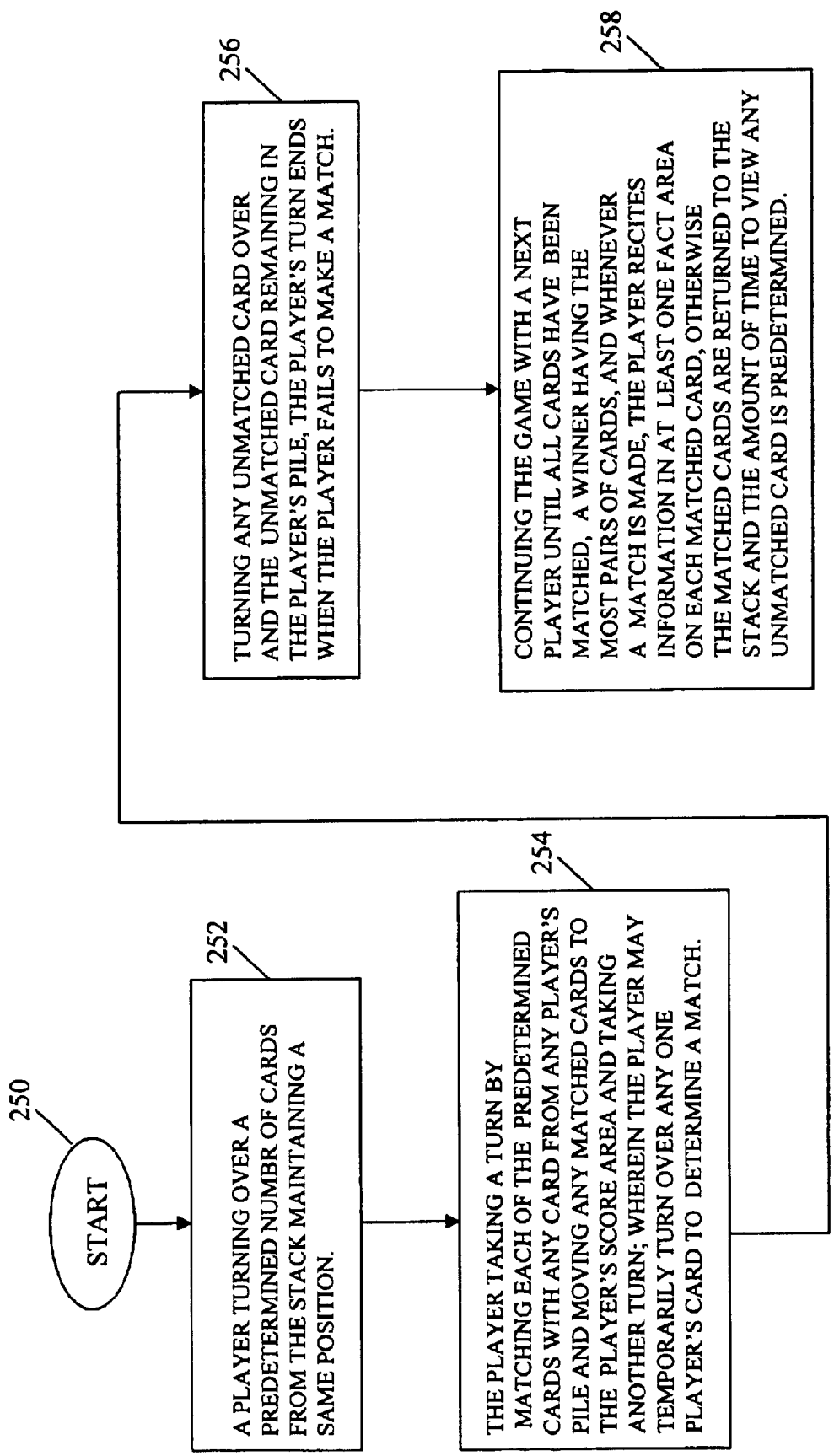

FIG. 8C shows steps of another embodiment beginning at step 250. At step 252, a player turns over a predetermined number of cards from the stack maintaining a same position. At step 254, the player takes a turn by matching each of the predetermined cards with any card from any player's pile and moving any card from any player's pile and moving any matched cards to the player's score area and taking another turn. The player may temporarily turn over any one of one player's card to determine a match. At step 256, any unmatched card is turned over and the unmatched card remaining in the player's pile. The player's turn ends when the player fails to make a match. At step 258, the game continues with a next player until all cards have been matched. A winner is the player having the most pairs of cards. Whenever a match is made, the player recites information in at least one fact area on each matched card, otherwise the matched cards are returned to the stack and the amount of time to view any unmatched cards is predetermined, for example about three seconds.

It would also be easy to replicate this card game in electronic game form. Representation of the cards and suits electronically and graphically via a software program either in a personal computer or stand-alone game device would be a straight forward conversion process, the form may take a different presentation, but the nature of associating information facts with the card play is possible electronically.

A card kit may also be made that includes at least one card deck with cards as described above that includes facts of information or equations. The kit may include multiple decks arranged by age brackets, subject areas, or both. The kit may also include rules for at least one embodiment of the card game for learning. The rules may be in one or more languages.

While the invention has been described in terms of preferred embodiments, those skilled in the arts will recognize that the invention can be practiced with modification within the spirit and scope of the appended claims.

Having thus described my invention, what I claim as new and desire by Letters Patent is as follows:

1. A method of playing a card game for learning, the method comprising the steps of:

providing a deck of cards that includes at least one fact area on every card, the fact area containing information being at least one of a complete factual statement and a complete equation;

dealing the cards to players to provide each player a hand and to begin the card game, non-dealt cards forming a stack;

without prompting, reciting at least one fact area on a card during the course of the card game so that the recitation provides an opportunity for learning the information associated with the fact area, and wherein the deck of cards includes four suits comprising hearts, clubs, diamonds, spades, and each suit including cards of rank.

2. The method of claim 1, further comprising the steps of:

each player turning up and playing a top card of their hand, the player with the highest ranking card winning a match;

the player winning the match, reciting correctly the fact area information, and if recited correctly placing all of the played cards on a pile, and if recited incorrectly, the non-winner placing all the played cards on their pile, and if the top cards are the same rank, each player placing one additional card facedown from their hand and another faceup, the player with the higher additional faceup card scoring a showdown and winning the match and all the cards played in the match; and reshuffling a player's pile when the player's stack is empty, and playing until one player scores a predetermined number of showdowns.

3. The method of claim 1, further comprising the steps of:

a player requesting any rank of card from another player, the player having at least one card of the requested rank;

the another player surrendering all cards of the requested rank from their hand, and if the another player has no card of the requested rank then tells the player to draw a predetermined number of cards from the stack, ending the player's turn;

placing a completed book faceup in the score-area, the completed book being four cards of the same rank obtained from at least one of the dealing step and the surrendering step;

reciting the fact area information from each card in the completed book when the completed book is placed faceup in a score area;

continuing play with a next player, the next player takes their turn as the player according to the requesting step, surrendering step, placing step, and reciting step;

finishing the game when any player runs out of cards in their hand, a winner having the most books.

4. The method of claim 1, further comprising the steps of:

turning over a top card from the stack and placing the top card faceup to form a discard pile;

a player taking a turn by drawing one of another top card from the stack and at least one card from the discard pile to add to their hand;

forming a spread, a spread placed in a scoring area and comprising one of:
three cards of a same rank,
four cards of a same rank, and
a sequence of at least three cards of a same suit;

discarding a card from the player's hand when one of an expansion and a spread cannot be formed during the player's turn;

finishing the game when one or more cards are placed in the player's scoring area by the player forming at least one of the spread, another spread, and an expansion of an existing spread, and discarding an unplayable card; and declaring a winner by counting predetermined points associated with each card in the scoring area of each player, the player with the highest point tally being the winner, and wherein at least one fact area's information is recited by the player when one of an expansion and a spread is formed, and the game comprises one or more players.

5. The method of claim 4, further comprising the step of adding to an already formed spread by placing one or more cards faceup forming an expansion of the already formed spread.

6. The method of claim 5, further including the step of reciting fact area information from the card forming the expansion of the already formed spread.

7. The method of claim 1, further comprising the steps of:

turning over a top card from the stack to form a discard pile;

a player choosing to perform one of:
a) matching by rank the top card of the discard pile with any card from their hand and placing the matching card from their hand onto the discard pile thereby creating a new top card in the discard pile and changing suit and reciting the fact area on the matching card by rank from their hand,
b) matching by suit the top card of the discard pile from their hand and placing the matching card by suit onto the discard pile thereby creating a new top card in the discard pile and changing rank,
c) playing a predetermined wild card thereby changing suits and reciting a fact area,
d) reversing direction of play when a reverse card is played on the discard pile, and
e) drawing a predetermined amount of cards when a draw card is played on the discard pile;

announcing "last card" when the player plays a next to last card from their hand and drawing another card from the stack if the announcement is omitted;

finishing the game when any player removes all of the cards from their hand.

8. The method of claim 1, further comprising the steps of:

a player playing a card of a suit from their hand;

each remaining player in turn playing a card of like suit from their hand to complete a round;

drawing a predetermined number of cards from the stack when a card of like suit cannot be played and playing a drawn card if the drawn card matches the suit previously played;

determining a winner of the round, the winner is the first player that played the highest card of rank;

the winner of the round reciting at least one fact of information from at least one played card during the round; and continuing the game, whereby the winner of a round leads a card to begin a next round;

finishing the game when any player removes all all the cards from their hand, and wherein the game comprises two to four players, each player dealt seven cards each.

9. The method of claim 1, wherein the deck of cards encompasses a subject area.

10. The method of claim 9, wherein the deck of cards encompasses a subject area scaled to an age bracket.

11. The method of claim 1, wherein the fact area information includes at least one of mathematical equation, chemical equation, physics equation, literature fact, language vocabulary, spelling fact, language grammar, science fact, religion fact, geography fact, and history.

12. The method of claim 1, wherein information contained in the fact areas on each card of the deck of cards is organized by categories, each category being associated with one of the four card suits.

13. The method of claim 1, wherein information contained in the fact areas on each card of the deck of cards is organized by categories, each category associated with at least one of a color, a suit and a rank.

14. A method of playing a card game for learning, the method comprising the steps of:
providing a deck of cards that includes at least one fact area on every card, the fact area containing information being at least one of a complete factual statement and a complete equation;
shuffling the deck of cards and placing the deck of cards facedown to create a stack and to begin the card game;
turning over at least one card during the course of the game;
without prompting, reciting at least one fact area during the course of the card game so that the recitation provides an opportunity for learning the information associated with the fact area, and
wherein the deck of cards includes four suits and cards of rank.

15. The method of claim 14, further comprising the steps of:
a player drawing up to a predetermined number of cards from the stack during a turn, then memorizing each up to the predetermined number cards and placing the up to the predetermined number cards facedown on the player's pile, wherein the information of the fact area on each of the up to the predetermined number of cards are recited up to three times to aid memorization;
the player restating in sequence the information of the fact area on each of the up to the predetermined number of cards;
the player turning each of the up to the predetermined number of cards over from the player's pile and if the restating of the information of the fact area matches the information of the fact area on each of the up to the predetermined number of cards in sequence, the player places the up to the predetermined number of cards in a score area, and the player placing any remaining of the up to the predetermined number of cards on a discard pile when restating of the information is incorrect;
continuing play with a next player until the stack runs out;
determining a winner by counting predetermined points for each individual rank of cards, a pair, three of a kind, and four of a kind.

16. The method of claim 14, further comprising the steps of:
a player turning over a predetermined number of cards from the stack while maintaining the cards in a fixed order in a location for viewing, each player in the game having a location for viewing;
the player taking a turn by matching each of the predetermined cards with any card from any player in the game's location for viewing and moving any matched cards to the player's score area and taking another turn;
turning any unmatched card over and the unmatched card remaining in the location for viewing, the player's turn ends when the player fails to make a match;
continuing the game with a next player in the game until all cards have been matched, a winner having the most pairs of cards, and
wherein whenever a match is made, the player recites information in at least one fact area on each matched card otherwise the matched cards are returned to the stack, and the amount of time to view any unmatched cards is predetermined.

17. A card deck for playing a card game and for learning subject information by repetitive audible recitation, the card deck comprising fifty two cards with four suits of hearts, spades, clubs, diamonds, and each suit containing thirteen cards of rank from 2 through 10, jack, queen, king, and ace, each of the fifty two cards including at least one fact area on the suit bearing face of each of the fifty two cards, the fact area including information being at least one of a complete factual statement and an equation, wherein the fact area includes a common noun or number across the four suits of a same rank and the equation includes a common number across the four suits of the same rank.

18. The card deck of claim 17, wherein the equation includes at least one of an addition equation, a subtraction equation, a multiplication equation, a division equation, and a chemical equation.

19. The card deck of claim 17, wherein the equations on each of the cards are organized by categories, the categories associated with one of card rank and card suit.

20. The card deck of claim 17, wherein the complete factual statements are organized by categories, the categories associated with at least one of color, card rank and card suit.

21. The card deck of claim 17, wherein the information contained in the fact areas is scaled by age bracket.

22. The card game of claim 17, wherein the factual statement includes one of a literature fact, spelling fact, language vocabulary, language grammar, science facts, religion fact, geography fact, and history fact.

23. The card deck of claim 17, wherein at least one common noun is in at least one different language.

24. A method of playing a card game for learning, the method
comprising the steps of:
providing a deck of cards that includes at least one fact area on every card, the fact area containing information being at least one of a factual statement and a complete equation;
providing at least one card to at least one player;
without prompting, reciting at least one fact area on a card during the course of a card game so that the recitation provides an opportunity for learning the information associated with the fact area, and
wherein the deck of cards includes suits and cards of rank, and the fact areas are associated with at least one of suits and ranks.

* * * * *